(12) United States Patent
     Cibis et al.

(10) Patent No.: US 12,606,084 B2
(45) Date of Patent: Apr. 21, 2026

(54) LIGHTING UNIT FOR A STEERING HANDLE OF A MOTOR VEHICLE, AND STEERING HANDLE HAVING SUCH A LIGHTING UNIT

(71) Applicant: ZF AUTOMOTIVE SAFETY GERMANY GMBH, Aschaffenburg (DE)

(72) Inventors: Mathias Cibis, Heigenbrücken (DE); Steffen Neuf, Rieneck (DE)

(73) Assignee: ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 0 days.

(21) Appl. No.: 18/702,826

(22) PCT Filed: Oct. 18, 2022

(86) PCT No.: PCT/EP2022/078917
     § 371 (c)(1),
     (2) Date: Apr. 19, 2024

(87) PCT Pub. No.: WO2023/066900
     PCT Pub. Date: Apr. 27, 2023

(65) Prior Publication Data
     US 2025/0229707 A1      Jul. 17, 2025

(30) Foreign Application Priority Data

Oct. 21, 2021    (DE) .................... 20 2021 105 769.6

(51) Int. Cl.
     *B60Q 3/283*          (2017.01)
     *B60K 35/21*          (2024.01)
     (Continued)

(52) U.S. Cl.
     CPC ............ *B60Q 3/283* (2017.02); *B60K 35/212* (2024.01); *B60K 35/60* (2024.01); *B60Q 3/60* (2017.02);
     (Continued)

(58) Field of Classification Search
     CPC .......... B60Q 3/283; B60Q 3/60; F21V 3/049; F21V 7/0066; F21W 2106/00; B60K 35/60; B60K 35/212
     (Continued)

(56) References Cited

U.S. PATENT DOCUMENTS

| | | | |
|---|---|---|---|
| 4,733,335 A | 3/1988 | Serizawa et al. | |
| 9,045,078 B2 * | 6/2015 | Tovar ..................... | B62D 1/046 |

(Continued)

FOREIGN PATENT DOCUMENTS

| | | |
|---|---|---|
| DE | 202005007004 U1 | 10/2006 |
| DE | 102016116596 A1 | 3/2017 |

(Continued)

OTHER PUBLICATIONS

PCT International Search Report for corresponding International Application Serial No. PCT/EP2022/078917, mailed Jan. 9, 2023, pp. 1-5.

*Primary Examiner* — Laura K Tso
(74) *Attorney, Agent, or Firm* — Tarolli, Sundheim, Covell & Tummino LLP

(57)                ABSTRACT

The invention relates to a lighting unit for a steering handle of a motor vehicle, which extends in a longitudinal direction (s), having: multiple lighting segments (22) situated one behind the other in the longitudinal direction (s); a diffusor (24), which forms an outer side (26) of the lighting unit (18) and emits light from the lighting unit (18) into the surroundings (28); multiple light sources (30), which are provided on an inner side (32) of the lighting unit (18) opposite the outer (Continued)

side (26), emit light towards the diffusor (24) and are at a distance ($x_1$) from the diffusor (24) transversely to the longitudinal direction (s), wherein to each lighting segment (22) is assigned at least one light source (30), and wherein a reflective body (36) is provided in a transition region (34) of two adjacent lighting segments (22) and protrudes from the inner side (32) of the lighting unit (18) towards the diffusor (24), wherein a minimum distance ($x_2$) between the reflective body (36) and the diffusor (24) is at most 20%, in particular at most 5%, of the distance ($x_1$) between the light sources (30) and the diffusor (24).

13 Claims, 3 Drawing Sheets

(51) Int. Cl.

| | | |
|---|---|---|
| *B60K 35/60* | (2024.01) | |
| *B60Q 3/60* | (2017.01) | |
| *F21V 3/04* | (2018.01) | |
| *F21V 7/00* | (2006.01) | |
| *F21W 106/00* | (2018.01) | |

(52) U.S. Cl.
CPC ............ *F21V 3/049* (2013.01); *F21V 7/0066* (2013.01); *F21W 2106/00* (2018.01)

(58) Field of Classification Search
USPC ........................................................ 362/488
See application file for complete search history.

(56) References Cited

U.S. PATENT DOCUMENTS

| | | | | |
|---|---|---|---|---|
| 2016/0025281 | A1* | 1/2016 | Gardner | ................. B62D 1/046 |
| | | | | 362/520 |
| 2019/0016383 | A1* | 1/2019 | Spencer | ................. B60Q 3/283 |
| 2022/0026044 | A1* | 1/2022 | Käbisch | ................. F21V 5/045 |

FOREIGN PATENT DOCUMENTS

| | | | |
|---|---|---|---|
| DE | 112015003354 | T5 | 4/2017 |
| DE | 102017218402 | A1 | 4/2019 |
| EP | 3127776 | A1 | 2/2017 |
| FR | 3028476 | A1 | 5/2016 |
| WO | 2016/014692 | A1 | 1/2016 |
| WO | 2019/137699 | A1 | 7/2019 |
| WO | 2020/202002 | A1 | 10/2020 |
| WO | 2021/020809 | A1 | 2/2021 |

* cited by examiner

LIGHTING UNIT FOR A STEERING HANDLE OF A MOTOR VEHICLE, AND STEERING HANDLE HAVING SUCH A LIGHTING UNIT

RELATED APPLICATIONS

This application is a U.S. National Stage Application filed under 35 USC 371, claiming priority to Serial No. PCT/EP2022/078917, filed on 18 Oct. 2022; which claims priority from Patent Application 20 2021 105 769.6, filed 21 Oct. 2021, the entireties of which are hereby incorporated herein by reference.

TECHNICAL FIELD

The invention relates to a lighting unit for a steering handle of a motor vehicle which extends in a longitudinal direction, comprising multiple lighting segments situated one behind the other in the longitudinal direction, a diffusor which forms an outer side of the lighting unit and emits light from the lighting unit into the surroundings, multiple light sources which are provided on an inner side of the lighting unit opposite to the outer side, emit light towards the diffusor and are at a distance from the diffusor transversely to the longitudinal direction, wherein at least one light source is assigned to each lighting segment. In addition, the invention also relates to a steering handle, and specifically to a vehicle steering wheel, having such a lighting unit.

BACKGROUND

The illumination of steering wheel elements has already been generally described in prior art and comprises, for example, multi-functional switches on the vehicle steering wheel which can be lighted and which allow to safely operate switches even in the dark. Further, the illumination of emblems or decorative elements is known to impart a particularly valuable appearance to the steering wheel. Meanwhile, lighting elements have been used also in the area of the steering wheel rim, wherein the illumination is not only used as a design element for optically enhancing the steering wheel, but increasingly also for signaling and communication with a vehicle occupant.

This communication with the vehicle occupant can be assisted, for example, by a lighting in different colors, or by light patterns in which individual lighting elements are selectively switched on and off.

From the generic document WO 2013/029727 A1, a steering handle in the form of a steering wheel is known already, wherein multiple illuminants are distributed over the circumference of the steering wheel rim. The fastening element for a steering wheel coating laid around the steering wheel rim comprises a light conductor which can be coupled to the illuminant.

In elongate light bands which, e.g., extend in the circumferential direction of a steering wheel rim and include multiple lighting segments situated one behind the other in the longitudinal direction, a partial lighting of the light band creates the effect that the light propagates from one lighted segment into adjacent non-lighted segments. Therefore, it is hardly possible to identify individual lighting segments, which impedes signaling that is clear and unambiguous for the vehicle occupant. It would be conceivable not to design the light band continuously and to structurally separate adjacent lighting segments from each other, which turns out to be complicated in terms of design, however. In addition, in such case a desirable, and specifically largely homogenous, continuous lighting of the light band is no longer possible.

SUMMARY

Therefore, it is the object of the invention to provide a lighting unit and a steering handle having such a lighting unit which allows for both a largely homogenous lighting of adjacent lighting segments and a well-defined discrete lighting of individual lighting segments.

According to the invention, this object is achieved by a lighting unit of the above-mentioned type in which a reflective body is provided at least in a transition region of two adjacent lighting segments and protrudes from the inner side of the lighting unit towards the diffusor, wherein a minimum distance between the reflective body and the diffusor is at most 20%, specifically at most 5%, of the distance between the light sources and the diffusor. Light spillover into adjacent lighting segments is largely prevented or at least strongly reduced by said reflective body protruding towards the diffusor in the transition region of two adjacent lighting segments. At the same time, the reflective body enables the whole assigned lighting segment to be homogenously illuminated up to the edge areas towards the adjacent lighting segments. In particular, a surface of a reflective body facing the diffusor extends substantially concavely approximately from a region adjacent to a light source (preferably the surface of the reflective body in said region is at the largest distance from the diffusor) to a transition region between two adjoining lighting segments (preferably the surface of the reflective body in said transition region is a the smallest distance from the diffusor), forms a convex crest in the transition region and then extends, again substantially concavely, to a region adjoining a light source of the adjacent lighting segment.

Preferably, the diffusor extends over at least two adjacent lighting segments, in particular over all lighting segments of the lighting unit. This results in a continuous smooth outer surface, wherein the light-scattering and/or refracting characteristics of the diffusor also enable multiple adjacent lighting segments to be lighted particularly homogenously. The vicinity of the reflective body to the diffusor in the transition region of two adjacent lighting segments allows to realize, at the same time, a relatively sharply defined lighting of individual lighting segments, however.

Further, the reflective body is preferred to be made of a white material and/or to have a reflective coating so that light incident on the reflective body is reflected towards the diffusor. Concretely, the reflective body can be made of an opaque plastic, and specifically an opaque white plastic.

In an embodiment of the lighting unit, a housing is provided, wherein the reflective body is formed integrally with the housing, in particular with a housing base and/or a housing sidewall of the housing. As a result, the housing and the reflective body can be manufactured in a simple and inexpensive manner, such as in an injection molding process. In this way, it is also possible to adjust the lighting unit to various geometries of the steering handle with little effort.

The housing of the lighting unit in this embodiment may have a housing sidewall, with the diffusor resting on the housing sidewall and preferably being also fastened to the housing sidewall. On the side of the housing opposite to the diffusor, a circuit board including multiple light sources may further be provided which can also be fastened to the housing, specifically to a housing base. In this case, the lighting unit constitutes a pre-assembled group which can be assembled quickly and easily in a recess of the steering handle.

In another embodiment of the lighting unit, at least two reflective bodies situated one behind the other in the longitudinal direction are provided, wherein a light conductor is provided between two adjacent reflective bodies. The light conductor is made, for example, of a transparent light-conducting plastic and, along with the reflective bodies, can form a two-component injection-molded part. The reflective bodies situated one behind the other in the longitudinal direction and each being provided in the transition region of two adjacent lighting segments can be spaced apart in the longitudinal direction or can merge integrally in the area of the light source(s). Inside a lighting segment, the light conductor ensures an as loss-free transport of the light energy as possible from the light source to the diffusor.

Preferably, the reflective bodies in this embodiment protrude from a surface of the light conductor facing the diffusor. As a result, the reflective bodies form a light barrier in the transition region of two adjacent lighting segments and prevent light from passing from one lighting segment into an adjacent lighting segment.

A surface of the light conductor facing the diffusor can have a defined, specifically an uneven three-dimensional geometrical structure to contribute to an as homogenous lighting of a lighting segment as possible by refraction. Accordingly, the light is usually guided to the edges or to the transition regions of the lighting segments so as to reach there a light intensity similar to that in the center of the lighting segment.

The reflective body preferably adjoins the diffusor of the lighting unit but is at a distance from the diffusor. The same is preferably also true for the light conductor, if present. The smaller the distance between the reflective body and the diffusor, the more sharply the lighting of adjacent lighting segments can be delimited. However, a contact is undesirable as such contact can be recognized from an outer side of the lighting unit and disturbs in particular homogenous lighting of multiple adjacent lighting segments. Ideally, the components of the lighting unit are dimensioned so that, with consideration of the respective measuring tolerances, a certain distance between the reflective body and the diffusor and, if necessary, also between the light conductor and the diffusor is guaranteed.

In another embodiment of the lighting unit, at least two reflective bodies situated one behind the other in the longitudinal direction are provided, wherein a surface of the diffusor facing the light sources between two adjacent reflective bodies is curved towards the light sources, and in particular wherein the diffusor and the reflective bodies overlap.

Incidentally, the invention also comprises a steering handle for a motor vehicle, specifically a vehicle steering wheel, comprising a steering axle about which the steering handle in the mounted state is rotatable, a central hub through which the steering axle extends, a grip which surrounds the hub at least partially, a connecting element which fastens the grip to the hub, and an above-described lighting unit, the lighting unit being integrated in the grip, and specifically in a foam cladding of the grip.

Preferably, the grip is a peripheral steering wheel rim which encloses the steering axle in the circumferential direction, the longitudinal direction of the lighting unit corresponding to the circumferential direction of the steering wheel rim.

BRIEF DESCRIPTION OF THE DRAWINGS

Further features and advantages of the invention will be evident from the following description of preferred embodiments with reference to the drawings, wherein.

DESCRIPTION

Figures 1, 2:
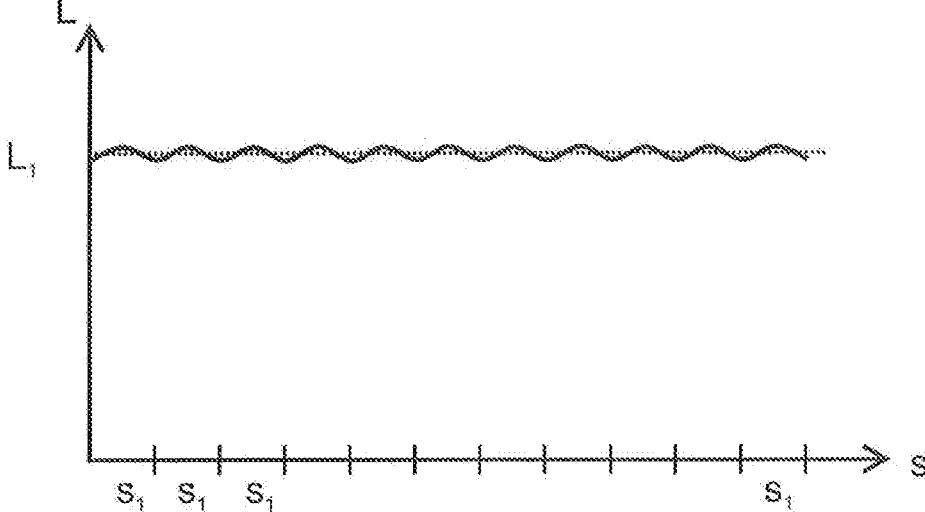
FIG. 1 shows a schematic top view of a steering handle according to the invention including a lighting unit according to the invention in the lighted state of all lighting segments.
FIG. 2 shows a diagram in which the light intensity L is plotted over a longitudinal direction s of the lighting unit according to FIG. 1.
Figure 3:
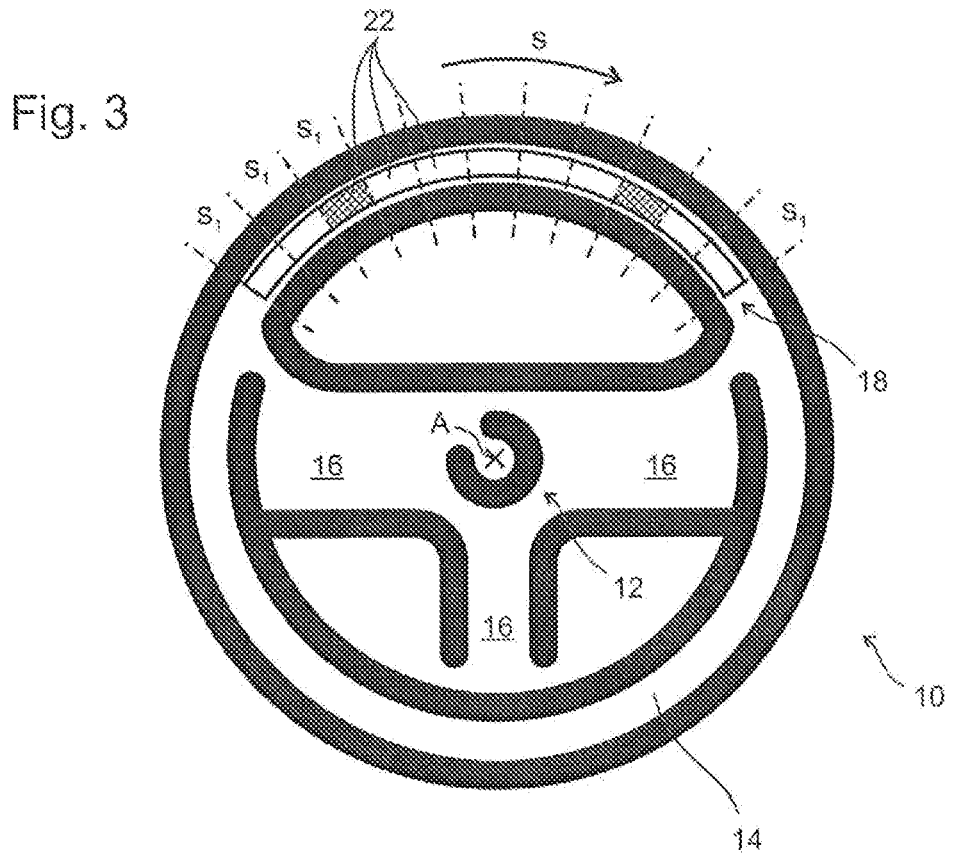
FIG. 3 shows a schematic top view of the steering handle including the lighting unit according to FIG. 1 in the lighted state of individual lighting segments.
Figures 5, 6, 7:
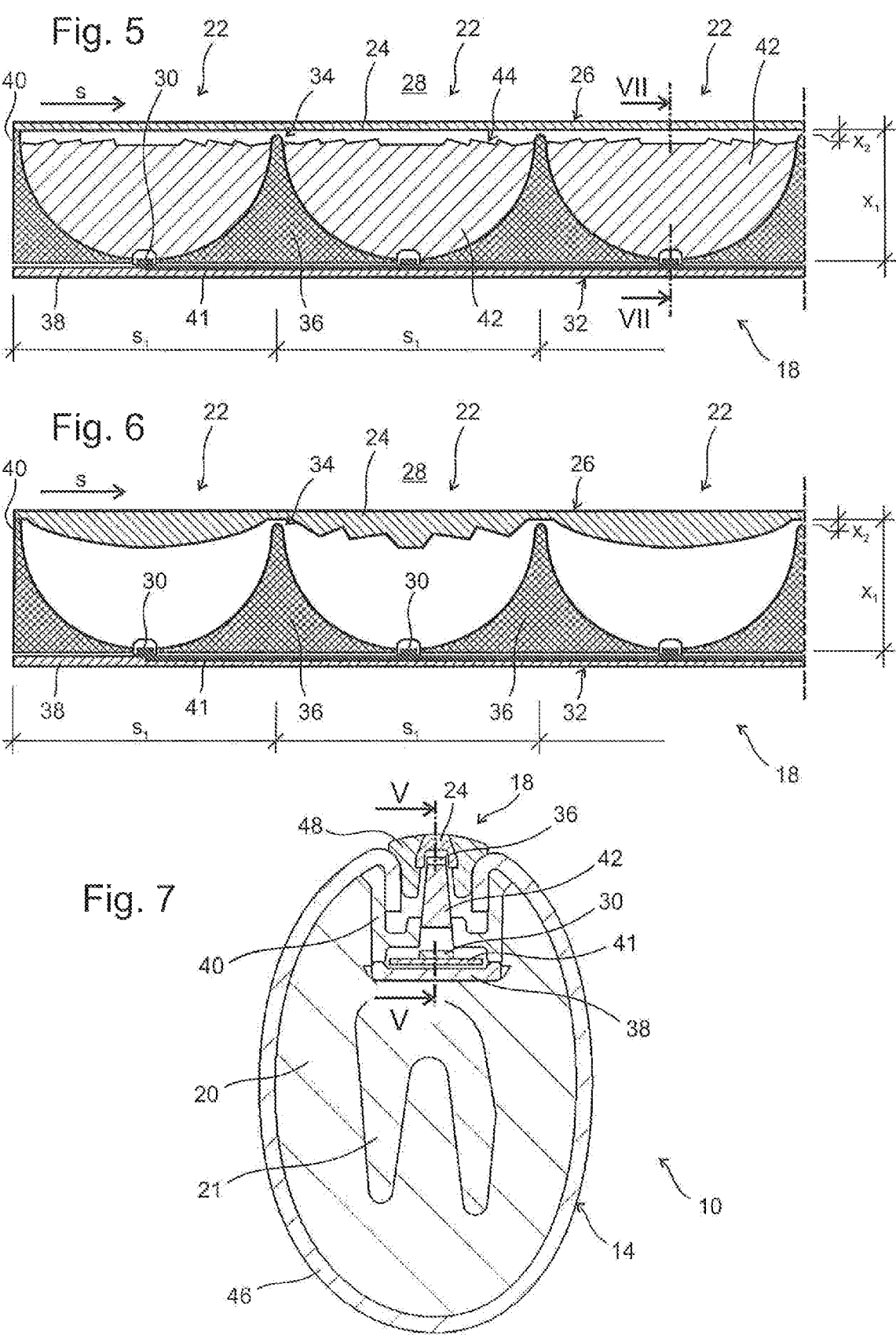
FIG. 5 shows a schematic longitudinal section across three lighting segments of a lighting unit according to the invention as set forth in an embodiment.
FIG. 6 shows a schematic longitudinal section across three lighting segments of a lighting unit according to the invention as set forth in another embodiment.
FIG. 7 shows a schematic section across a grip of the steering handle according to FIG. 1 in the area of the lighting unit according to the invention.

In each of FIGS. 1 and 3, the schematic top view of a steering handle 10 for a motor vehicle is shown, comprising a steering axle A about which the steering handle 10 in the mounted state is rotatable, a central hub 12 through which the steering axle A extends, a grip 14 which surrounds the hub 12 at least partially, a connecting element 16 which fastens the grip 14 to the hub 12, and an elongate lighting unit 18 which extends in a longitudinal direction s and is integrated in the grip 14, and specifically in a foam cladding 20 of a skeleton 21 of the grip 14 (see FIG. 7).

In the present embodiment, the steering handle 10 is in the form of a vehicle steering wheel in which the grip 14 is a peripheral steering wheel rim which encloses the steering axle A in the circumferential direction, the circumferential direction of the steering wheel rim corresponding to the longitudinal direction s of the lighting unit 18. Further, three connecting elements 16 in the form of spokes are provided to connect the closed peripheral steering wheel rim to the hub 12.

The lighting unit 18 of the steering handle 10 includes multiple lighting segments 22 which are situated one behind the other in the longitudinal direction s, wherein FIG. 1 illustrates a lighted state of all lighting segments 22 and FIG. 2 illustrates an associated diagram in which a light intensity L is plotted over the longitudinal direction s of the lighting unit 18. On the other hand, in FIG. 3 only individual lighting segments 22, concretely the third and the ninth of the eleven lighting segments 22 are in a lighted state, wherein FIG. 4 illustrates the corresponding associated diagram in which the light intensity L is plotted over the longitudinal direction s.

It becomes clear that, when all lighting segments 22 are lighted, in the longitudinal direction s an almost constant desired light intensity L1 is adjusted across the entire dimension of the lighting unit 18 (see FIGS. 1 and 2). The lighting of the entire lighting unit 18 as a light band thus appears to be extremely homogenous. Possible deviations from the desired light intensity L1 are so small that they are not perceived, or at least not perceived as disturbing, by a vehicle occupant, and therefore are negligible.

Figure 4:
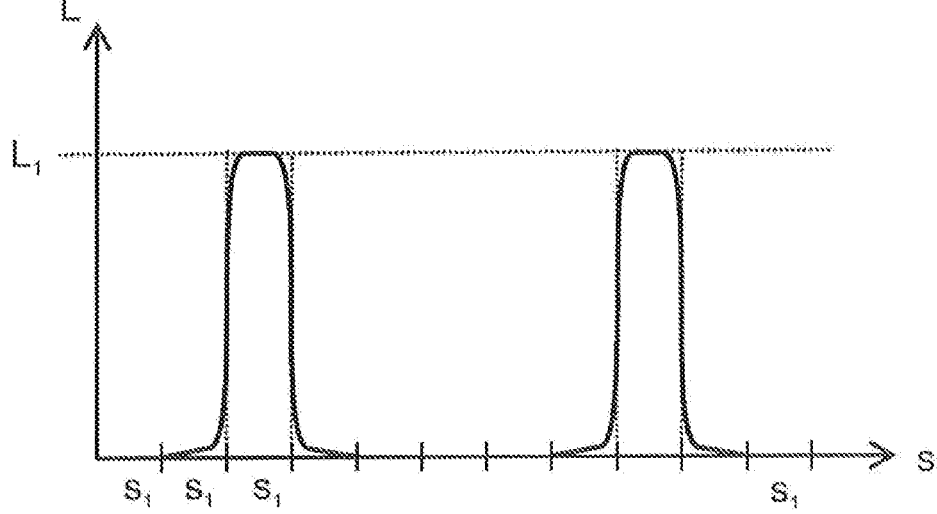
FIG. 4 shows a diagram in which the light intensity L is plotted over a longitudinal direction s of the lighting unit according to FIG. 3.

Moreover, for the lighting of individual lighting segments 22, propagation of the light to adjacent non-lighted lighting segments 22 is largely suppressed, while the respective lighted lighting segment 22 is lighted in the longitudinal direction s extremely evenly across its dimension s1 with the desired light intensity L1 (see FIGS. 3 and 4). This relatively sharp separation between lighted and non-lighted sections of the lighting unit 18 facilitates a signaling which is felt to be clear and unambiguous by a vehicle occupant.

For this purpose, the steering handle 10 of a motor vehicle includes a lighting unit 18 which hereinafter will be described in detail on the basis of FIGS. 5 to 7.

The elongate lighting unit 18 extends in the longitudinal direction s and comprises multiple lighting segments 22 situated one behind the other in the longitudinal direction s, a diffusor 24 which forms an outer side 26 of the lighting unit 18 and emits light from the lighting unit 18 into the surroundings 28, and multiple light sources 30 which are provided on an inner side 32 of the lighting unit 18 opposite to the outer side 26, are at a distance x1 from the diffusor 24 transversely to the longitudinal direction s and emit light towards the diffusor 24.

In the illustrated embodiments of the lighting unit 18 according to FIGS. 5 and 6, the diffusor 24 extends over at least two adjacent lighting segments 22, and specifically over all lighting segments 22.

At least one light source 30 is assigned to each lighting segment 22, wherein an opaque reflective body 36 is provided in a transition region 34 of two adjacent lighting segments 22 and protrudes from the inner side 32 of the lighting unit 18 towards the diffusor 24. Accordingly, a minimum distance x2 between the reflective body 36 and the diffusor 24 is at most 20%, in particular at most 5%, of the distance x1 between the light sources 30 and the diffusor 24.

As is schematically exemplified in FIGS. 5 and 6, the surface of a reflective body 36 facing the diffusor 24 extends from the area of a light source 30 in which it has the maximum distance x1 from the diffusor 24 substantially concavely to a transition region 34 between two adjoining lighting segments 22 in which it has the smallest distance x2 from the diffusor 24. In the transition region 34, the surface of the reflective body 36 forms a convex crest and then extends in turn substantially concavely to the area of an adjacent light source 30. The concave and convex surface areas, respectively, either can have a continuous curvature or can be approximated by linear sections in the manner of a polygonal line.

In order to direct a luminous flux of the light sources 30 as loss-free as possible towards the diffusor 24, the opaque reflective body 36 is made of a white material, in particular white plastic, and/or is provided with a reflective coating.

In the illustrated embodiments, the lighting unit 18 further includes a housing having a housing base 38 and a housing sidewall 40, wherein the reflective body 36 is formed integrally with the housing, in particular with the housing base 38 and/or the housing sidewall 40.

With reference to the longitudinal direction s, the diffusor 24 can rest on the housing sidewall 40 particularly in the end area of the lighting unit 18 and can be fastened to the housing sidewall 40, as indicated in FIGS. 5 and 6.

The light sources 30 assigned to the individual lighting segments 22 are in the form of LEDs or other illuminants and, in the present embodiments, are arranged on a circuit board 41. Said circuit board 41 is fastened to the housing, specifically to the housing base 38, so that the lighting unit 18 forms a pre-assembled group which can then be assembled quickly and easily in a recess of the steering handle 10.

FIG. 5 illustrates an embodiment of the lighting unit 18 in which multiple reflective bodies 36 situated one behind the other in the longitudinal direction are provided, with a light conductor 42 being arranged between two respective adjacent reflective bodies 36. The light conductors 42 are made of transparent plastic and can be manufactured along with the reflective bodies 36 as a two-component injection-molded part.

In the transition region 34 of two adjacent lighting segments 22, the reflective bodies 36 protrude from a surface of the light conductors 42 facing the diffusor 24 to prevent light from propagating from one lighting segment 22 into an adjoining lighting segment 22.

As indicated in FIG. 5, each of the surfaces of the light conductors 42 facing the diffusor 24 has a defined geometrical structure 44, in particular an uneven/three-dimensional structure 44. The light intensity L can be influenced locally by means of an appropriate surface structure so that the entire lighting segment 22 is illuminated in a particularly homogenous manner.

In order to ensure an as homogenous illumination as possible even when plural adjacent lighting segments 22 are lighted, the reflective bodies 36 and the light conductors 42 directly adjoin the diffusor 24, to be sure, but are at a distance from the diffusor 24 so that no undesired contact points visible from outside will occur.

FIG. 6 shows another embodiment of the lighting unit 18 which also includes multiple reflective bodies 36 situated one behind the other in the longitudinal direction s and which substantially differs from the embodiment according to FIG. 5 in that a surface of the diffusor 24 facing the light sources 30 between two adjacent reflective bodies 36 is curved towards the light sources 30. The curvature of said inner side of the diffusor 24 can be realized either by a continuous curvature of the diffusor surface (see FIG. 6, left and right lighting segments 22) or a linear approximation (see FIG. 6, central lighting segment 22).

In combination with an appropriately adjusted geometry of the reflective body 36 and a suitable light source 30, said constructional modification of the diffusor 24 can help dispense with a light conductor 42 (FIG. 5) without the homogenous illumination of the lighting segments 22 being negatively affected. As a matter of course, also configuration variants in which the lighting unit 18 according to FIG. 6 additionally includes a light conductor 42 are conceivable, however.

As is clear from FIG. 6, the curvature on the inner side of the diffusor 24 is particularly distinctive so that the diffusor 24 and the reflective body 36 overlap transversely to the longitudinal direction s.

FIG. 7 finally illustrates a section VII-VII across the grip 14 of the steering handle 10 according to FIG. 1 in the foam cladding 20 of which a lighting unit 18 according to FIG. 5 is accommodated. The lighting unit 18 in this case is designed with the housing, the circuit board 41 including light sources 30, reflective bodies 36 and (optional) light conductors 42 as a prefabricated assembly which is inserted into a recess of the foam cladding 20. Subsequently, the grip 14 is provided at least partly with a sheathing 46 (for example with leather or artificial leather), before the lighting unit 18 is closed by a housing cover 48, wherein the diffusor 24 is integrated in the housing cover 48. When the housing cover 48 is attached, an edge of the sheathing 46 is clamped between the housing cover 48 and the housing sidewall 40 so that the sheathing 46 is reliably prevented from undesirably detaching at the edge. As an alternative, or in addition to fastening the housing cover 48 and the diffusor 24, respectively, by clamping to the housing of the lighting unit 18, also a latching and/or gluing can be provided, of course.

The invention claimed is:

1. A lighting unit for a steering handle of a motor vehicle which extends in a longitudinal direction, comprising
  multiple lighting segments situated next to each other in the longitudinal direction,
  a diffusor which forms an outer side of the lighting unit and emits light from the lighting unit into the surroundings,
  multiple light sources which are provided on an inner side of the lighting unit opposite to the outer side, emit light towards the diffusor and are at a distance from the diffusor transversely to the longitudinal direction,
  wherein at least one light source is assigned to each lighting segment,
  wherein a reflective body is provided in a transition region of two adjacent lighting segments and protrudes from the inner side of the lighting unit towards the diffusor,
  wherein a minimum distance between the reflective body and the diffusor is at most 20%, of the distance between the light sources and the diffusor.

2. The lighting unit according to claim 1, wherein the diffusor extends over at least two adjacent lighting segments.

3. The lighting unit according to claim 1, wherein a housing is provided, wherein the reflective body is formed integrally with the housing.

4. The lighting unit according to claim 3, wherein the housing includes a housing sidewall, with the diffusor resting on said housing sidewall.

5. The lighting unit according to claim 1, wherein the reflective body is made of a white material and/or includes a reflective coating.

6. The lighting unit according to claim 1, wherein at least two reflective bodies situated one behind the other in the longitudinal direction are provided, wherein a light conductor is provided between two adjacent reflective bodies.

7. The lighting unit according to claim 6, wherein the reflective bodies protrude from a surface of the light conductor facing the diffusor.

8. The lighting unit according to claim 6, wherein a surface of the light conductor facing the diffusor has a defined geometrical structure.

9. The lighting unit according to claim 1, wherein at least two reflective bodies situated one behind the other in the longitudinal direction are provided, wherein a surface of the diffusor facing the light sources between two adjacent reflective bodies is curved towards the light sources.

10. The lighting unit according to claim 1, wherein the reflective body is at a distance from the diffusor.

11. A steering handle for a motor vehicle, comprising
  a steering axle about which the steering handle when mounted can be rotated,
  a central hub through which the steering axle extends,
  a grip which at least partially surrounds the hub,
  a connecting element which secures the grip to the hub, and
  a lighting unit according to claim 1,
  wherein the lighting unit is integrated in the grip.

12. The steering handle according to claim 11, wherein the grip is a peripheral steering wheel rim which encloses the steering axle in the circumferential direction, wherein the longitudinal direction of the lighting unit corresponds to the circumferential direction of the steering wheel rim.

13. The lighting unit according to claim 1, wherein the minimum distance between the reflective body and the diffusor is at most 5% of the distance between the light sources and the diffusor.

* * * * *